United States Patent [19]

Jager et al.

[11] 3,832,466
[45] Aug. 27, 1974

[54] 3-AZOLYLPROPYNE FUNGICIDAL AGENTS

[75] Inventors: Gerhard Jager; Karl Heinz Buchel, both of Wuppertal-Elberfeld; Ferdinand Grewe, Burscheid; Paul-Ernst Frohberger, Leverkusen, all of Germany

[73] Assignee: Bayer Aktiengesellschaft, Leverkusen, Germany

[22] Filed: May 26, 1972

[21] Appl. No.: 257,365

[30] Foreign Application Priority Data
June 9, 1971  Germany........................... 2128700

[52] U.S. Cl................................. 424/273, 424/248
[51] Int. Cl............................................... A01n 9/22
[58] Field of Search ............. 424/273, 248; 260/309

[56] References Cited
UNITED STATES PATENTS

| | | | |
|---|---|---|---|
| 2,971,006 | 2/1961 | Mayhew et al. | 424/273 |
| 3,321,366 | 5/1967 | Mussell et al. | 424/273 |
| 3,479,367 | 11/1969 | Miller | 424/273 |
| 3,661,924 | 5/1972 | Martin et al. | 424/273 |
| 3,709,901 | 1/1972 | Draber et al. | 424/273 |

*Primary Examiner*—Albert T. Meyers
*Assistant Examiner*—D. W. Robinson
*Attorney, Agent, or Firm*—Burgess, Dinklage & Sprung

[57] ABSTRACT

Fungicidal and bactericidal compositions comprising, and methods of combating fungi and bacteria using 3-azolylpropynes of the general formula

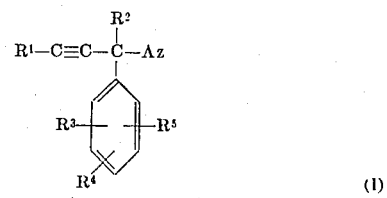

(I)

in which $R^1$ is hydrogen, chlorine, bromine, iodine, alkyl, an optionally substituted aryl, aryloxyalkyl, arylthioalkyl, arylaminoalkyl or arylalkylaminoalkyl group, alkoxyalkyl, alkylmercaptoalkyl, alkylaminoalkyl, or dialkylaminoalkyl wherein the two alkyl radicals of the dialkylamino moiety may form, with the amine nitrogen atom, a five-membered to seven-membered ring that may contain at least one further hetero-atom or hetero-group, $R^2$ is alkyl, optionally substituted cycloalkyl or optionally substituted aryl, $R^3$, $R^4$ and $R^5$ each independently is hydrogen, alkyl, alkoxy, alkylmercapto or an electronegative substituent, and Az represents an optionally substituted five-membered heterocyclic radical containing one or more nitrogen atoms, or their salts.

9 Claims, No Drawings

3-AZOLYLPROPYNE FUNGICIDAL AGENTS

The present invention relates to and has for its objects the provision of fungicidal and bactericidal compositions of 3-azolylpropynes, i.e. 3-substituted-3-(optionally substituted)-phenyl-3-[imidazolyl-(1)]-propyne-(1) or its salts, in the form of mixtures of such compounds with solid and liquid dispersible carrier vehicles, preferably containing a surface-active agent, and methods for using such compounds in a new way especially for combating fungi and bacteria, with other and further objects becoming apparent from a study of the within specification and accompanying examples.

It has been disclosed in U.S. Pat. No. 3,321,366 that 1-tritylimidazoles, especially 1-tritylimidazole (Compound A) and tris-(p-chlorophenyl)-methyl-1-imidazole (Compound B), possess fungitoxic properties. The activity of such compounds is, however, not always entirely satisfactory, especially if small amounts are used.

It has now been found that the 3-azolylpropynes of the general formula

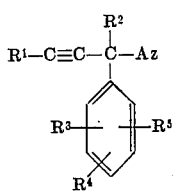

in which

R$^1$ is hydrogen, chlorine, bromine, iodine, alkyl, an optionally substituted aryl, aryloxyalkyl, arylthioalkyl, arylaminoalkyl or arylalkylaminoalkyl group, alkoxyalkyl, alkylmercaptoalkyl, alkylaminoalkyl, or dialkylaminoalkyl wherein the two alkyl radicals of the dialkylamino moiety may form, with the amine nitrogen atom, a five-membered to seven-membered ring that may contain at least one further hetero-atom or hetero-group, R$^2$ is alkyl, optionally substituted cycloalkyl or optionally substituted aryl, R$^3$, R$^4$ and R$^5$ each independently is hydrogen, alkyl, alkoxy, alkylmercapto or an electronegative substituent, and Az represents an optionally substituted five-membered heterocyclic radical containing one or more nitrogen atoms, as well as their salts, display strong fungicidal and bactericidal properties.

In the formula (I) it is preferred that R$^1$ should be hydrogen, bromine, iodine, straight-chain or branched alkyl with 1 to 6 carbon atoms, aryloxyalkyl (especially a phenoxymethyl such as a lower alkylphenoxymethyl), lower alkylamino-lower alkyl with 1 to 4 carbon atoms in each alkyl moiety or di-lower alkylamino-lower alkyl (especially a morpholinomethyl); that R$^2$ should be straight-chain or branched alkyl with up to 6 carbon atoms or unsubstituted phenyl; that R$^3$ should be hydrogen, straight-chain or branched alkyl with up to 3 carbon atoms or an electronegative substituent such as chlorine or nitro; that R$^4$ and R$^5$ should both be hydrogen; and that Az should be an imidazole ring.

The present invention thus provides a fungicidal or bactericidal composition containing as active ingredient a compound of the formula (I), or a salt thereof, in admixture with a solid or liquefied gaseous diluent or carrier or in admixture with a liquid diluent or carrier containing a surface-active agent.

The present invention also provides a method of combating fungi and bacteria which comprises applying to the fungi or bacteria or a fungus or bacterium habitat a compound of the formula (I), or a salt thereof, alone or in the form of a composition containing as active ingredient such a compound or salt in admixture with a diluent or carrier.

Surprisingly, the 3-azolylpropynes of the formula (I) show a considerably higher fungitoxic activity than the 1tritylimidazoles known from the state of the art, which are the chemically closest active substances having the same type of action. The present invention thus represents a valuable enrichment of the art.

As examples of the active compounds to be used according to the invention, there may be mentioned:

1. 3,3-diphenyl-3-[imidazolyl-(1)]-propyne-(1),
2. 3,3-diphenyl-3-[imidazolyl-(1)]-propyne-(1) nitrate
3. 3,3-diphenyl-3-[imidazolyl-(1)]-propyne-(1) naphthalene-1,5-disulfonate,
4. 3-phenyl-3-(3-methylphenyl)-3-[imidazolyl-(1)]-propyne-(1)
5. 3-phenyl-4-methyl-3-[imidazolyl-(1)]-pentyne-(1)
6. 1,3-diphenyl-4,4-dimethyl-3-[imidazolyl-(1)]-pentyne-(1),
7. 1,3-diphenyl-3-[imidazolyl-(1)]-butyne-(1),
8. 1,3-diphenyl-3-(3-nitrophenyl)-3-[imidazolyl-(1)]-propyne-(1),
9. 3,3-diphenyl-3-[imidazolyl-(1)]-1-bromo-propyne-(1),
10. 3,3-diphenyl-3-[imidazolyl-(1)]-1-iodo-propyne-(1),
11. 1-(2-ethylphenoxy)-4-phenyl-4-[imidazolyl-(1)]-pentyne-(2),
12. 1,1-diphenyl-1-[imidazolyl-(1-]-octyne-(2),
13. 1,1-diphenyl-4-morpholino-1-[imidazolyl-(1)]-butyne-(2)
14. 1,3,3-triphenyl-3-[imidazolyl-(1)]-propyne-(1),
15. 1,3-diphenyl-3-(2-methylphenyl)-3-[imidazolyl-(1)]-propyne-(1),
16. 1,3-diphenyl-3-(4-chlorophenyl)-3-[imidazolyl-(1)]-propyne-(1), and
17. 1,3-diphenyl-3-(3-methylphenyl)-3-[imidazolyl-(1)]-propyne-)1).

The compounds of the formula (I) as such, their preparation and their use as anti-mycotics are described in Patent Application Ser. No. 177,843, filed Sept. 3, 1971, now abandoned.

The compounds are obtained either by reacting 3-hydroxypropynes with approximately the equivalent amount of a thionyl-bis-azole in an inert organic solvent in the temperature range of about 0° to 120°C, whereupon, the addition to the azole that is split off and sulfur dioxide, the desired product of the general formula (I) is obtained, or by reacting organometallic compounds, such as 1-(3-azolyl)-propynyllithium (or sodium, potassium or magnesium) halide with an alkyl halide in an inert solvent in the temperature range of about 0° to 120°C. In both processes, the reactants are preferably reacted in equimolar amounts. The preferred reaction temperature range is from about 20° to 80°C. The reaction products are isolated in the customary manner, for example by washing with water, drying the solution and precipitating the reaction product as the hydrochloride by means of hydrogen chloride.

The basic compounds (I) can be obtained by reaction with potassium carbonate and these can be converted into salts by further reaction with acids, in a generally known manner. The 3-hydroxypropynes required as intermediates can be obtained according to methods that are known in principle (see, in this context, Angewandte Chamie 7l, 245 (1959). The organometallic compounds to be used as intermediates for the second synthesis mentioned are obtained if azolylpropynes (obtainable, for example, in accordance with the first process mentioned) are reacted with alkali metals or special, particularly reactive organometallic compounds (for example butyllithium or methylmagnesium chloride) in anhydrous inert solvents.

The active compounds that can be used according to the invention show a strong fungitoxic and bacteriotoxic action.

They do not harm crop plants in the concentrations required for combating fungi and bacteria and have a low toxicity towards warm-blooded animals. For these reasons they can be used as plant-protection agents for combating fungi and bacteria. Fungitoxic agents are employed in plant protection for combating *Archimycetes*, *Phycomycetes*, *Ascomycetes*, *Basidiomycetes* and *Fungi Imperfecti*.

The active compounds that can be used according to the invention have a very broad spectrum of activity and can be employed against parasitary fungi and bacteria that attack the above-ground parts of plants or attack the plants through the soil, as well as against seed-borne organisms that cause disease.

The active compounds which can be used according to the invention act against fungi such as, for example, *Cochliobolus miyabeanus*, *Mycosphaerella musicola*, *Cercospora personata*, *Botrytis cinerea* and varieties of *Alternaria*, varieties of *Venturia* (which cause apple scab and pear scab), *Plamsmopara viticola* and powdery mildew fungi, such as *Podosphaera leucotricha* (powdery mildew of apples) and *Erysiphe cichoracearum* (powdery mildew of cucumbers, which infect various crop plants. Surprisingly, the active compounds not only show a protective action but also a curative and a systemic effect.

The active compounds that can be used according to the invention have also proved successful for combating diseases in rice. Thus they show an excellent action against the fungi *Piricularia oryzae* and *Pellicularia sasakii*, for which reason they can be employed for conjointly combating both these diseases. This represents a significant advance since agents of different chemical constitutions have hitherto generally been used for combating these two fungi.

The active compounds are also highly active and of particular practical significance if they are used as seed dressings or soil-treatment agents against phytopathogenic fungi that adhere to the seed or occur in soil and cause diseases of seedlings, root rots, tracheomycoses, or diseases of the stem, stalk, leaf, blossom, fruit or seed in crop plants, such as *Tilletia caries*, *Helminthosporium gramineum*, *Fusarium culmorum*, *Rhizoctonia solani*, *Phialophora cinerescens*, *Verticillim alboatrum*, *Fusarium dianthi*, *Fusarium cubense*, *Fusarium oxysporum*, *Fusarium solani*, *Sclerotinia sclerotiorum*, *Thielaviopsis basicola* and *Phytophthora cactorum*.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, colutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, ect.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides and bactericides, or insecticides, acaricides, rodenticides, nematocides, herbicides, fertilizers, growth-regulating agents, repellents, etc., if desired, or in the form of particular dosage preparations for specific appliction made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and-/or a dispersing agent, and an amount of the active compound which is effective for the purpose in question and which is generally between about 0.0001–95 percent, and preferably 0.01–95 percent, by weight of the mixture.

In the treatment of seed, amounts of active compound of about 0.1 to 10 g, preferably about 0.5 to 5 g per kg of seed, are generally required. For the treatment of soil, amounts of active compound of about 1 to 500, preferably about 10 to 200 g, per cubic meter of soil are generally required.

The active compounds can also be used in accordance with the well known ultra-low-volume process with good success, i.e. by applying such compound of normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g. fungi and bacteria, which comprises applying to as least one of correspondingly (a) such fungi, (b) such bacteria, and (c) the corressponding habitat thereof, i.e. the locus to be protected, a correspondingly combative or toxic amount, i.e. a fungicidally or bactericidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Mycelium Growth Test
  Culture medium used:
   20 parts by weight of agar-agar
   200 parts by weight of potato decoction
   5 parts by weight of malt
   15 parts by weight of dextrose
   5 parts by weight of peptone
   2 parts by weight of disodium phosphate
   0.3 part by weight of calcium nitrate
  Ratio of solvent mixture to culture medium:
   2 parts by weight of solvent mixture
   100 parts by weight of agar culture medium
  Composition of solvent mixture:
   0.19 part by weight of dimethylformamide
   0.01 part by weight of alkylarylpolyglycol ether
   1.80 part by weight of water The amount of active compound required for the desired concentration of active compound in the nutrient medium is mixed with the stated amount of solvent. The concentrate is thoroughly mixed in the stated proportion with the liquid nutrient medium which has been cooled to 42°C and is then poured into Petri dishes of 9 cm diameter. Control dishes to which the preparation has not been added are also set up.

When the nutrient medium has cooled and solidified, the dishes are inoculated with the species of fungi stated in the Table and incubated at about 21°C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:
 0 no fungus growth
 1 very strong inhibition of growth
 2 medium inhibition of growth
 3 slight inhibition of growth
 4 growth equal to that of untreated control.

The active compounds, their concentrations and the results obtained can be seen from Table 1:

TABLE 1.—MYCELIUM GROWTH TEST

| Active compounds | Active compound concentration p.p.m. | Fungi | | | | | | | |
|---|---|---|---|---|---|---|---|---|---|
| | | Piricularia oryzae | Phialophora cinerescens | Pellicularia sasakii | Mycosphaerella musicola | Verticillium alboatrum | Fusarium dianthi | Cochliobolus miyabeanus | Colletotrichum colfeanum |
| Compound (B) (known) | 10 | 3 | 4 | 4 | 4 | 4 | 4 | 4 | 3 |
| Compound (6) | 10 | 0 | 0 | — | 0 | — | 1 | 0 | 0 |
| Compound (7) | 10 | 0 | 0 | 2 | 0 | 3 | 3 | 0 | 1 |
| Compound (8) | 10 | 0 | 2 | — | 0 | 3 | 3 | 1 | 3 |
| Compound (next) | 10 | 0 | 0 | | 0 | 0 | 0 | 0 | 0 |
| Compound (next) | 10 | 0 | 0 | | 0 | 2 | 1 | 0 | 0 |
| Compound (4) | 10 | 0 | 0 | 1 | 0 | 0 | 0 | 0 | 0 |

TABLE 1.—MYCELIUM GROWTH TEST—Continued

| Active compounds | Active compound concentration p.p.m. | Piricularia oryzae | Phialophora cinerescens | Pellicularia sasakii | Mycosphaerella musicola | Verticillium alboatrum | Fusarium dianthi | Cochliobolus miyabeanus | Colletotrichum colfeanum |
|---|---|---|---|---|---|---|---|---|---|
| (2) | 10 | 0 | 0 | 1 | 0 | 0 | 0 | 0 | 0 |
| (3) | 10 | 0 | 0 | 3 | 0 | 0 | 0 | 0 | 0 |
| (12) | 10 | 0 | 2 | 2 | 0 | 2 | 3 | 0 | 1 |
| (11) | 10 | 0 | — | — | 0 | 2 | 3 | 2 | 0 |
| (13) | 10 | 0 | 1 | 2 | 0 | 3 | 3 | 2 | 1 |
| (9) | 10 | 0 | 0 | 2 | 0 | 1 | 2 | 0 | 0 |
| (10) | 10 | 0 | 1 | 2 | 0 | 0 | 2 | 0 | 1 |

EXAMPLE 2

Agar plate test
Test for fungitoxic effectiveness and breadth of the activity spectrum.
Solvent: Acetone
Parts by weight: a. 1000, b. 100

To produce a suitable preparation of the active compound, 1 part by weight of the active compound is taken up in the stated amount of solvent.

To potato dextrose agar which has been liquified by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm diameter. The Petri dishes remain at 20°C for 3 days for incubation.

After this time, the inhibiting action of the active compound on the mycelium growth is determined in categories, taking into account the untreated control. 0 means no mycelium growth, either on the treated substrate or on the inoculum; the symbol — means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table:

TABLE 2.—AGAR PLATE TEST

| Active compound | Active compound concentration in the substrate in mg./liter of substrate | Corticium rolfsii | Sclerotinia sclerotiorum | Thielaviopsis basicola | Phytophthora cactorum | Fusarium culmorum | Fusarium oxysporum | Fusarium solani f. pisi |
|---|---|---|---|---|---|---|---|---|
| Untreated | | + | + | + | + | + | + | + |
| 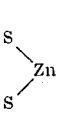 (C) (known) | a 10 <br> b 100 | + <br> + | + <br> + | + <br> 0 | <br> | + <br> + | + <br> + | + <br> + |
|  (A) (known) | a 10 <br> b 100 | + <br> + | + | − | + <br> + | − | + <br> + | + <br> + |
| 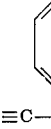 (14) | b 100 | 0 | 0 | − | + | + | 0 | + |
|  (7) | b 100 | 0 | 0 | − | + | + | 0 | + |
|  (1) | a 10 <br> b 100 | + <br> − | − <br> − | 0 <br> 0 | − <br> 0 | 0 <br> 0 | 0 <br> 0 | 0 <br> 0 |

TABLE 2.—AGAR PLATE TEST—Continued

| Active compound | Active compound concentration in the substrate in mg./liter of substrate | Fungi | | | | | | |
|---|---|---|---|---|---|---|---|---|
| | | Corticium rolfsii | Sclerotinia sclerotiorum | Thielaviopsis basicola | Phytophthora cactorum | Fusarium culmorum | Fusarium oxysporum | Fusarium solani f. pisi |
| 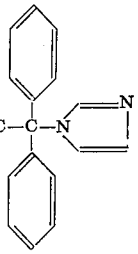 (12) | a 10 / b 100 | 0 / 0 | + / − | − / − | − / − | + / + | − / − | + / − |
| 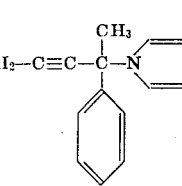 (11) | b 100 | − | − | − | − | + | + | + |
| 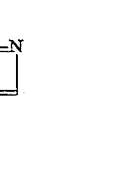 (5) | b 100 | + | + | 0 | 0 | 0 | 0 | 0 |
| 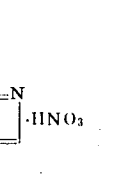 (2) | a 10 / b 100 | + / + | + / 0 | 0 / 0 | + / 0 | 0 / 0 | + / 0 | + / 0 |
| 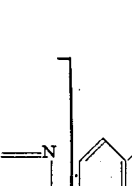 (3) | a 10 / b 100 | + / 0 | + / 0 | 0 / 0 | + / 0 | 0 / 0 | + / 0 | + / 0 |
| 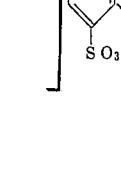 (9) | a 10 / b 100 | + / + | + / − | 0 / 0 | + / 0 | + / ± | 0 / 0 | 0 / 0 |
| 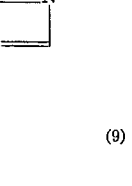 | a 10 / b 100 | + / + | + / + | 0 / 0 | ± / − | − / − | 0 / 0 | 0 / 0 |
| 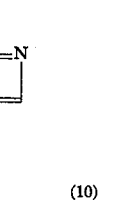 (10) | a 10 / b 100 | + / + | + / + | 0 / 0 | + / − | − / − | 0 / 0 | 0 / 0 |

EXAMPLE 3

Erysiphe test

Solvent: 4.7 parts by weight acetone
Emulsifier: 0.3 parts by weight alkylaryl polyglycol ether The amount of the active compound required for the desired concentration of active compound in the spray liquid is mixed with the stated amount of the solvent, and the concentrate is diluted with the stated amount of water containing the stated additions.

Young cucumber plants with about three foliage leaves are sprayed with the spray liquid until dripping wet. The cucumber plants remain in a greenhouse for 24 hours to dry. They are then, for the purpose of inoculation, dusted with conidia of the fungus *Erysiphe cichoracearum*. The plants are subsequently placed in a greenhouse at 23°–24°C and at a relative atmospheric humidity of about 75 percent.

After 12 days, the infection of the cucumber plants is determined as a percentage of the untreated but also inoculated control plants. 0 percent means no infection; 100 percent that the infection is exactly as great as in the case of the control plants.

The active compounds, the concentrations of the active compounds and the results obtained can be seen from the following Table:

TABLE 3
[*Erysiphe* test]

| Active compound | Infection in percent of the infection of the untreated control at a concentration of active compound (in percent by weight) of— | | |
|---|---|---|---|
| | 0.00019 | 0.00009 | 0.00004 |
| 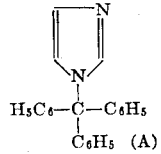 (A) | 26 | 39 | 57 |
| 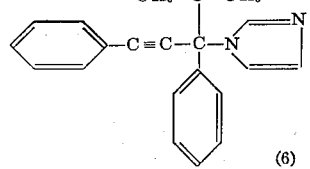 (6) | 0 | 18 | 52 |

EXAMPLE 4

Podosphaera test (powdery mildew of apples) [Protective]

Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4 – 6 leaf stage are sprayed with the spray liquid until dripping wet. The plants remain in a greenhouse for 24 hours at 20°C and at a relative atmospheric humidity of 70 percent. They are then inoculated by dusting with conidia of the apple powdery mildew causative organism (Podosphaera leucotricha Salm.) and placed in a greenhouse at a temperature of 21°–23°C and at a relative atmospheric humidity of about 70 percent.

Ten days after the inoculation, the infection of the seedlings is determined as a percentage of the untreated but also inoculated control plants.

0 percent means no infestation; 100 percent means that the infection is exactly as great as in the case of the control plants.

The active compounds, the concentrations of the active compounds and the results obtained can be seen from the following Table:

TABLE 4
[*Podosphaera* test/protective]

| Active compound | Infection in percent of the infection of the untreated control at an active compound concentration of (in percent by weight) of— | |
|---|---|---|
| | 0.00156 | 0.00078 |
| 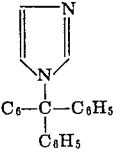 (A) | 54 | 68 |
| 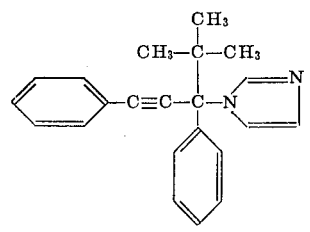 (6) (known) | 5 | 20 |
| 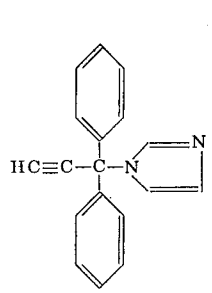 (1) | 6 | 12 |
| 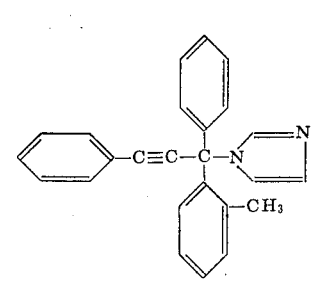 (15) | 30 | 58 |
| 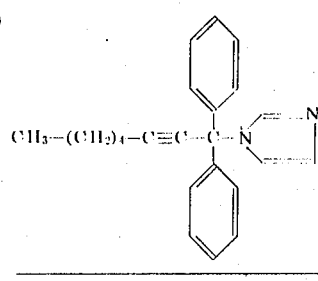 (12) | | 0 |

TABLE 4

[*Podosphaera* test/protective]

| Active compound | Infection in percent of the infection of the untreated control at an active compound concentration of (in percent by weight) of— | |
|---|---|---|
| | 0.00156 | 0.00078 |
| (structure 4): phenyl-C(CH≡C)(imidazolyl)-C6H4-CH3 (4) | 0 | 1 |
| (structure 9): Br-C≡C-C(phenyl)(imidazolyl)-phenyl (9) | 5 | — |

TABLE 5

[*Fusicladium* test/curative]

| Active compound | Dwell time in hours | Infection in percent of the infection of the untreated control at an active compound concentration (in percent by weight) of— | | |
|---|---|---|---|---|
| | | 0.0125 | 0.0062 | 0.0031 |
| H₃C₆—C(imidazolyl)(C₆H₅)—C₆H₅ (A) (known) | 42 | 100 | 100 | 100 |
| HC≡C—C(phenyl)(imidazolyl)-phenyl (1) | 42 | 0 | 0 | 5 |

EXAMPLE 5

Fusicladium test (apple scab) (Curative)
Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4 – 6 leaf stage are inoculated with an aqueous conidium suspension of the apple scab causative organism (*Fusicladium dendriticum Fuckel*) and incubated for 18 hours in a humidity chamber at 18°–20°C. and at an atmospheric humidity of 100 percent. The plants are then brought into a greenhouse to dry.

After standing for a suitable period of time, the plants are sprayed dripping wet with the spray liquid prepared in the manner described above. The plants are again placed in a greenhouse.

15 days after inoculation, the infestation of the apple seedlings is determined as a percentage of the untreated but also inoculated control plants.

0 percent means no infestation; 100 percent means that the infestation is exactly as great as in the case of the control plants.

The active compounds, the concentrations of the active compounds, the period of time between inoculation and spraying and the results obtained can be seen from the following Table:

EXAMPLE 6

Piricularis and Pellicularia Test
Solvent: 1.9 parts by weight of dimethylformamide
Dispersing agent: 0.1 part by weight of alkylarylpolyglycol ether
Water: 98 parts by weight of water The amount of active compound required for the desired concentration of active compound in the spray liquor is mixed with the stated amount of solvent, and the concentrate is diluted with the stated amount of water containing the stated additives.

2 batches each consisting of 30 rice plants about 2 – 4 weeks old are sprayed with the spray liquor until dripping wet. The plants remain in a greenhouse at temperatures of 22° to 24°C and a relative atmospheric humidity of about 70 percent until they are dry. One batch of the plants is then inoculated with an aqueous suspension of 100,000 to 200,000 spores/ml of *Piricularia oryzae* and placed in a chamber at 24° – 26°C and 100 percent relative atmospheric humidity. The other batch of the plants is infected with a culture of *Pellicularia sasakii* grown on malt agar and placed at 28° – 30°C and 100 percent relative atmospheric humidity.

5 to 8 days after inoculation, the infection of all the leaves present at the time of inoculation with *Piricularia oryzae* is determined as a percentage of the untreated but also inoculated control plants. In the case of the plants infected with *Pellicularia sasakii*, the infection on the leaf sheaths after the same time is also determined in proportion to the untreated but infected control. 0 percent means no infection; 100 percent means that the infection is exactly as great in the case of the control plants.

The active compounds, the concentrations of the active compounds and the results obtained can be seen from the following Table:

TABLE 6
[*Piricularia* (a) and *Pellicularia* (b) test/protective]

| Active compound | Infection in percent of the infection of the untreated control at an active compound concentration (in percent by weight) of— | | | |
|---|---|---|---|---|
| | (a) | | (b) | |
| | 0.05 | 0.025 | 0.05 | 0.025 |
| (A) (known) 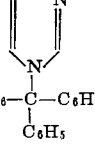 | 50 | 75 | 100 | ------ |
| (B) (known) 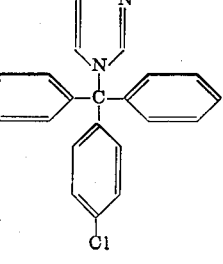 | 100 | ------ | 100 | ------ |
| (1) 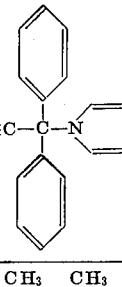 | 0 | 0 | 13 | 75 |
| (5) 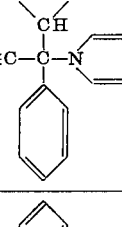 | 25 | 25 | 0 | 50 |
| (4) 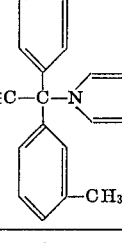 | 0 | 0 | 25 | 50 |
| (2) 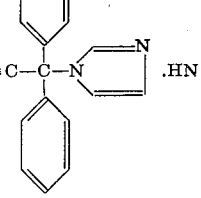 | 0 | 0 | ------ | ------ |
| (3)  | 25 | 25 | ------ | ------ |

EXAMPLE 7

Seed dressing test/stripe disease of barley (seed-borne mycosis)

To produce a suitable dry dressing, the active compound is extended with a mixture of equal parts by weight of talc and kieselguhr to give a finely powdered mixture with the desired concentration of active compound.

To apply the dressing, barley seed, which is naturally infested by *Helminthosporium gramineum*, is shaken with the dressing in a closed glass flask. The seed, on moist filter paper discs in closed Petri dishes, is exposed to a temperature of 4°C for 10 days in a refrigerator. The germination of the barley, and possibly also of the fungus spores, is thereby initiated. Two batches of 50 grains of the pregerminated barley are subsequently sown 2 cm deep in Fruhstorfer standard soil and cultivated in a greenhouse at temperatures of about 18°C in seed boxes which are exposed to light for 16 hours daily. The typical symptoms of the stripe disease develop within 3 to 4 weeks.

After this time, the number of diseased plants is determined as a percentage of the total number of emerged plants. The fewer plants are diseased, the more effective is the active compound.

The active compounds, the concentration of the active compounds in the dressing, the amounts of dressing used and the number of diseased plants can be seen from Table 7:

TABLE 7.—SEED DRESSING TEST/STRIPE DISEASE OF BARLEY

| Active compound | Active compound [1] | Amount of dressing used in g./kg. of seeds | Number of plants [2] |
|---|---|---|---|
| Without dressing | | | 41.8 |
| (C) (known)  | 10 | 2 | 37.8 |
| | 30 | 2 | 38.1 |

TABLE 7.—SEED DRESSING TEST/STRIPE DISEASE OF BARLEY—Continued

| Active compound | Active compound [1] | Amount of dressing used in g./kg. of seeds | Number of plants [2] |
|---|---|---|---|
| 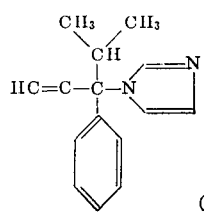 (known). | 30 | 2 | 33.9 |
| 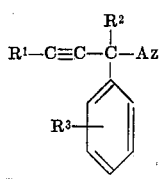 (5) | 3<br>10 | 2<br>2 | 1.1<br>0.0 |

[1] Concentration in the dressing in percent by weight.
[2] Suffering from stripe disease, in percent of the total plants which have germinated.

It will be appreciated that the instant specification and examples are set forth by way of illustration and not limitation, and that various modifications and changes may be made without departing from the spirit and scope of the present invention.

What is claimed is:

1. The method of combating fungi which comprises applying to a fungus a fungus habitat a fungicidally effective amount of a 3-azolylpropyne of the formula $$R^1-C\equiv C-\underset{\underset{R^3-\phantom{X}}{\overset{R^2}{|}}}{C}-Az$$

in which
R$^1$ is hydrogen, bromine, iodine, straight-chain or branched alkyl with 1 to 6 carbon atoms, phenoxymethyl, or morpholinomethyl;
R$^2$ is straight-chain or branched alkyl with up to 6 carbon atoms or unsubstituted phenyl;
R$^3$ is hydrogen, straight-chain or branched alkyl with up to 3 carbon atoms,; and
Az is an imidazole ring
or a salt thereof.

2. The method of claim 1, wherein such 3-azolylpropyne is 3,3-diphenyl-3-[imidazolyl-(1)]-propyne-(1) of the formula

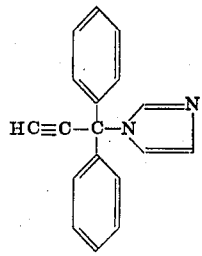

(1)

or the nitrate or naphthalenedisulfonic acid salt thereof.

3. The method of claim 1 wherein such 3-azolylpropyne is 3-phenyl-3-(3-methylphenyl)-3-[imidazolyl-(1)]-propyne-(1) of the formula

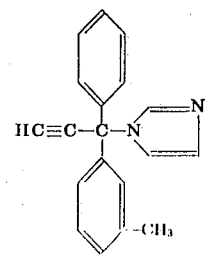

(4)

4. The method of claim 1 wherein such 3-azolylpropyne is 3-phenyl-4-methyl-3-[imidazolyl-(1)]-pentyne-(1) of the formula

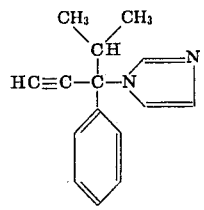

(5)

5. The method of claim 1 wherein such 3-azolylpropyne is 1,3-diphenyl-4,4-dimethyl-3-[imidazolyl-(1)]-pentyne-(1) of the formula

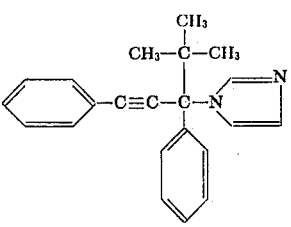

(6)

6. The method of claim 1 wherein such 3-azolylpropyne is 3,3-diphenyl-3-[imidazolyl-(1)]-1-bromo-propyne-(1) of the formula

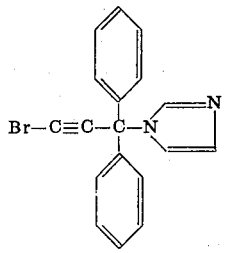

(9)

7. The method of claim 1 wherein such 3-azolylpropyne is 1,1-diphenyl-1-[imidazolyl-(1)]-octyne-(2) of the formula

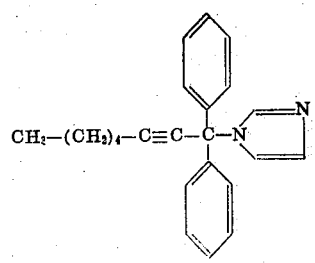

(12)

8. A fungicidal composition containing as active ingredient a fungicidally effective amount of a 3-azolylpropyne of the formula

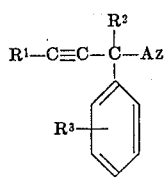

in which
R[1] is hydrogen, bromine, iodine, straight-chain or branched alkyl with 1 to 6 carbon atoms, phenoxymethyl, or morpholinomethyl;
R[2] is straight-chain or branched alkyl with up to 6 carbon atoms or unsubstituted phenyl;
R[3] is hydrogen, straight-chain or branched alkyl with up to 3 carbon atoms; and
Az is an imidazole ring
or a salt thereof, in admixture with a pesticide diluent.

9. A fungicidal composition according to claim 8, wherein the 3-azolylpropyne is
3,3-diphenyl-3-[imidazolyl-(1)]-propyne-(1),
3-phenyl-3-(3-methylphenyl)-3-[imidazolyl-(1)]-propyne-(1),
3-phenyl-4-methyl-3-[imidazolyl-(1)]-pentyne-(1),
1,3-diphenyl-4,4-dimethyl-3-[imidazolyl-(1)]-pentyne-(1),
3,3-diphenyl-3-[imidazolyl-(1)]-1-bromo-propyne-(1), or
1,1-diphenyl-1-[imidazolyl-(1)]-octyne-(2).

* * * * *

UNITED STATES PATENT OFFICE
CERTIFICATE OF CORRECTION

Patent No. 3,832,466      Dated August 27, 1974

Inventor(s) Gerhard Jager et al

It is certified that error appears in the above-identified patent and that said Letters Patent are hereby corrected as shown below:

Col. 2, line 16, cancel "ltrytylimidazoles" and substitute
-- 1-tritylimidazoles --.

Col. 3, line 12, cancel "Chamie 7l" and substitute
-- Chemie 71 --.

Col. 4, line 8, correct spelling of "solutions"

Col. 4, line 52, correct spelling of "etc."

Col. 7, after fifth formula insert -- (1) --;
after sixth formula insert -- (5) --.

Col. 8, Table 1, under heading "Pellicularia sasakii", for
formula (1), insert -- 1 --;
same heading, for formula (5) insert -- 2 --.

Col. 9, Table 1, Compound (10), in the structural formula,
cancel " $\mu$ ".

Cols. 13 and 14, Table 2, Compound (3), cancel statistics for
Table and substitute
-- a  10  +  +  0  +  0  +  +
   b 100  0  0  0  0  0  0  0 --.

Cols. 13-14, Table 2, Compound (10), cancel last two lines on
page beginning with "a" and "b".

Col. 15, line 40, Table 3, Compound (A), at bottom of formula,
insert -- (Known) --.

UNITED STATES PATENT OFFICE
CERTIFICATE OF CORRECTION

Patent No. 3,832,466    Dated August 27, 1974

Inventor(s) Gerhard Jager et al    Page 2 of 2.

It is certified that error appears in the above-identified patent and that said Letters Patent are hereby corrected as shown below:

Col. 16, Line 25, Table 4, Compound (A), at bottom of formula, insert --(Known)--.

Signed and sealed this 8th day of April 1975.

(SEAL)
Attest:

RUTH C. MASON
Attesting Officer

C. MARSHALL DANN
Commissioner of Patents
and Trademarks